March 14, 1944.    L. A. GRAHAM    2,344,352
REVERSIBLE POWER DRIVE
Filed May 4, 1942

INVENTOR.
Louis A. Graham.
BY
John W. Michael
ATTORNEY.

Patented Mar. 14, 1944

2,344,352

UNITED STATES PATENT OFFICE 2,344,352

REVERSIBLE POWER DRIVE

Louis A. Graham, Milwaukee, Wis., assignor to Graham Transmissions, Inc., Milwaukee, Wis., a corporation of Delaware Application May 4, 1942, Serial No. 441,683

7 Claims. (Cl. 74—388)

This invention relates to a reversible power drive controllable as to position and velocity, and while capable of a great variety of uses is particularly adaptable for embodiment in aiming and sighting devices of all kinds where a moving target must be followed at speeds which vary at all times in conformity with the motion of the target, and which must pass through zero and change in direction when the direction in target motion changes.

An object of the present invention is to provide a power drive of this character, which is highly sensitive in its response to the control exercised by the operator, which is smooth and precise in its action, especially as there is no shock whatsoever in going through zero to the speed ranges available either in forward or reverse, and wherein there is a minimum loss of energy on reversal in that the only elements in the drive that are reversed in motion are light in weight and turn at a comparatively low speed. The device is small and compact in construction, provides a closer speed control at all speeds, is efficient, smooth and shock-free in operation, and easy and comparatively inexpensive to manufacture.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a diagrammatic view, partly in elevation and partly in cross section, illustrating one application of the invention and showing the same applied to the reverse power drive of a turret, which, in the instance illustrated, is utilized as a gun mount;

Figure 2 is a diagrammatic view illustrating the electrical circuit for the pilot motor embodied in the reversible power drive and also illustrating the reversing switch incorporated in its pilot motor circuit;

Figure 3 is a diagrammatic view similar to Figure 2 but showing the controlling circuits for the pair of solenoids which regulate the action of the reversing switch incorporated in the pilot motor circuit and also illustrating the solenoid circuits designed for both position and velocity control; and Figure 4 is a view in end elevation of the positioning rheostat or controller incorporated in the circuits for the windings of the solenoids.

Referring to the drawing, and more particularly to Figure 1, it will be seen that the invention comprises a device to be trained, shown in the embodiment illustrated as a pair of guns 1. These guns are mounted in any suitable way not illustrated in a reversely rotatable turret 2, and are constrained to rotate with the turret in any suitable or appropriate way. The turret is illustrative of a reversely movable support upon which the device to be trained is mounted.

The power drive itself comprises an electric motor 5 which constantly turns in the same direction. The armature shaft of the motor 5 drives a variable speed mechanical transmission designated generally at 6, one which is capable of equal speeds both sides of zero without reversing the motor. In the construction illustrated, the transmission 6 is a variable speed planetary transmission, preferably one of the type illustrated in the Gibson Patent 1,887,505, granted November 15, 1932, for "Variable speed transmission," or in United States Letters Patent 2,267,034, granted December 23, 1941, to Alain Madle, for "Variable speed transmission."

A transmission of this character comprises generally a housing 7 having suitable bearings rotatably supporting an input shaft 8 and an output shaft 9. The input shaft 8 is connected to the armature shaft of the electric motor 5 and is driven thereby. In some suitable way the input shaft drives a rotary carrier, designated generally at 10. One or more inclined planetary conical rollers 11 are supported on this carrier 10 for rotation therewith and with respect thereto. Each roller 11 has a planet pinion 12 interconnected with its small ends so as to be rotatable therewith, the planet pinions meshing with an internal orbit gear 13 fixed to and turned by the output shaft 9. A control ring 14 encircles and contacts the rollers 11 and is adjustable lengthwise thereof to regulate their motion and thereby provide for a zero speed and also for variation of forward and reverse speeds in infinitesimal amounts on both sides of zero.

The output shaft 9 is connected by suitable gearing to the reversible support or turret 2. This gearing is diagrammatically illustrated as bevel gears 15 which provide a driving connection between the output shaft 9 and a shaft 16 journaled for rotation in suitable bearings 17. The shaft 16 is in turn connected through bevel gears 18 to a vertical shaft 19. A pinion 20 is fixed to the vertical shaft 19 and meshes with an internal ring gear 21 fixed to the turret 2. By some such suitable gearing the rotation of the output shaft 9 is transmitted to the turret or reversible support 2.

A shifting rod 25 has one end fixed to a projection 26 of the control ring 14 and the opposite end of this shaft rod is fixed to one end of a rack bar 27. The rack bar 27 is constrained to reciprocating motion in suitable guides 28 provided on a support 29. A rack pinion 30 meshes with the rack bar 27 and when rotated reciprocates the rack bar and consequently shifts the control ring 14 lengthwise of the rollers 11 to regulate their motion in the manner described. The rack pinion 30 is fixed to one end of the shaft 31, the opposite end of which is driven by an electric pilot or servo-motor 32.

The circuit for the pilot motor 32 is illustrated in Figure 2. As shown, the armature 33 of the pilot motor is equipped with brushes 34 and 35. The brush 34 is connected by a wire 36 to one side of the power line designated at 37. The other brush 34 is connected by wire 38 to a movable contact 39 of a reversing switch incorporated in the motor circuit and designated as a whole at R. The field of the motor is designated at 40.

The reversing switch R includes the contact 39 and a similar movable contact 41, which is directly connected to the other side 42 of the power line designated at 42. Cooperable with the movable contacts 39 and 41 are movable contact strips, designated at 43, 44, 45, and 46, respectively. These contact strips 43 to 46, inclusive, are supported on the rack bar 27 in any suitable way so that they partake of the reciprocating movements of the rack bar. The contact strip 46 is connected by a wire 47 with a wire 48. At one end, the wire 48 is connected to the contact strip 43 and the other end is connected to one side of the field 41. The opposite side of the field 41 is connected to one end of a wire 49 which has branches 50 and 51 connected to the contacts 45 and 44, respectively.

The reversing switch R may be conveniently actuated electro-magnetically and for this purpose its movable contacts 39 and 41 are mounted on a carrier or operator 52 which is fixed to and depends from the common plunger or core 53 of a pair of solenoids designated generally at S and S'. The windings of the solenoids S and S' are designated at 57 and 58.

When both solenoids S and S' are deenergized, the contact carrier 52 is positioned so that when the contacts 39 and 41 are positioned intermediate and out of contact with the contact strips 43, 44, 45, and 46, as illustrated in Figures 1 and 2, the transmission is at zero output speed. This is accomplished by providing a pair of coil springs 55 and 56, which surround spaced portions of the plunger 53. The outer ends of the springs 55 and 56 abut the frames of the solenoids S and S', respectively, and their inner ends abut the collars 55' and 56' fixed to the plunger 53. The springs 55 and 56 are of the same strength and under the same compression to exert the biasing action demanded, and the location of contact carrier 52 is then such as to bring control ring 14 to a position on rollers 11 corresponding to zero speed, as will hereinafter be explained.

The energization of the windings 57 and 58 may be regulated by either a positioning rheostat 60 or a velocity control rheostat 61 depending upon the adjustment of a three-way switch, designated generally at 62.

One side of the power line for the solenoid circuit, designated at 63, is electrically connected to the adjustable arm 64 of the velocity control rheostat 65. The terminal 66 of this rheostat 61 is connected by a wire 67 to a terminal 68 of the three-way switch 62. The three-way switch 62 has a movable blade contact 69 which is selectively engageable with fixed contacts 70, 71, and 72, incorporated in the three-way switch. The contact 70 of the three-way switch is connected by a wire 74 with a movable contact arm 75 of the positioning rheostat 60.

The rheostat 60 is provided with two electrical resistances, designated at 76 and 77, and there are gaps of insulation 78 and 79 between these resistance elements 76 and 77. The resistance element 76 has a terminal 80 connected by wire 81 to the terminal 82 provided at one end of the winding 57 of the solenoid S. The other terminal 83 of the winding 57 of the solenoid S is connected by a wire 84 to the other side 85 of the power line. The terminal 86 of the resistance element 77 is connected by wire 87 to the terminal 88 of the winding 58 of the solenoid S'. The other terminal 89 of this winding 58 is connected by a wire 90 to the power line 85. The terminals 71 and 72 of the three-way switch are connected by wires 91 and 92 to the wires 81 and 87, respectively.

The resistance elements 76 and 77 of the positioning rheostat are supported on a suitable insulating ring which in turn is rotatably supported, in any suitable way, as for instance by a carrier plate 93 on a suitable bracket 95. A handle 96 is connected to the carrier plate 93 of the positioning rheostat 60 and may be grasped or manipulated to rotate the positioning rheostat 60 with respect to its movable contact arm 75. The contact arm 75 is fixed to one end of a control shaft 98 supported for rotation in a suitable bearing 99 and connected by suitable reduction gearing 100 to the output shaft 9 of the variable speed transmission 6 so that the motion of the movable arm 75 of the positioning rheostat is synchronized with the motion of the output shaft. The velocity controlled rheostat 61 has its movable arm 64 manually adjustable.

With this construction, and with the three-way switch being positioned as shown in full lines in Figure 3, the device is set for positioning control. By turning the ring-like support of the rheostat to move the resistance element 76 into contact with the contact arm 75 thereof, the solenoid S is energized and the plunger 53 is pulled to the left, as viewed in Figures 1 and 3. This shifts the contacts 39 and 41 of the reversing switch over into engagement with the contact strips 43 and 44 of the rack bar, thereby completing the circuit through the pilot motor 32 since current now flows from the power line 42 to contact 41 through contact strip 44, wires 51 and 49, to the field 41 of the pilot motor, thence through wire 48 to contact strip 43, through contact 39 and wire 38 to brush 35, through the armature 33 of the pilot motor, back through the brush 34 and wire 36 to the other side 37 of the power line. As the pilot motor is energized its armature drives the rack pinion 31 and consequently acts through the rack bar and shifter rod 25 to move the control ring 14 to the left as viewed in Figure 1. The control ring 14 is then shifted from the zero speed band of the planet rollers 11 to a forward speed. As the transmission gets into the forward speed range its output shaft 9 is turned to drive the turret 2 as required. The motion of the output shaft 9 is transmitted through the reduction gearing 100 to the control shaft 98 which causes the contact arm 75 of the positioning rheostat to move back across the resistance element 76 until it comes into engagement with the insulating gap 78.

As the contact arm 75 moves back toward the insulating gap 78, the resistance in the circuit for the solenoid S is increased so that the intensity of the electric magnet field thereof is reduced with the result that the spring 55 gradually moves the plunger 53 to the right and consequently moves the contact carrier 52 in the same direction to bring the contacts 39 and 41 toward the spaces or gaps between the contact strips 43, 44, 45, and 46. This time the rack bar 27 has been shifted to the left so that as the action progresses the movable contacts 39 and 41 first are presented to the gaps or spaces between the contact strips 43, 44, 45, and 46 to stop the pilot motor, but due to the fact that the rack bar 27 has been shifted to the left, the contacts 39 and 41 will not only become disengaged from the contact strips 43 and 44, but will move over into engagement with the contact strips 45 and 46. Consequently, the pilot motor will be reversed and the rack bar 27 will be shifted to the right as viewed in Figure 1 until it restores the control ring 14 to the zero speed band of the planet rollers 11, at which time the contacts 39 and 41 will be disengaged from all of the contact strips 43 to 46, inclusive. As a consequence of this operation, the turret 2 is not only shifted but it remains stationary in the desired relation. A similar action occurs while the contact 75 is swung over into engagement with the resistance element 77, but of course the action now occurs in the solenoid S'. However, the mode of operation is exactly the same as that which occurs when the cylinder S is energized, save of course that the operation is reversed.

If the three-way switch is adjusted so that the movable contact 69 is disengaged from the fixed contact 70, then the positioning rheostat is cut out of the circuit and by engaging the movable contact blade 69 with the contacts 71 or 72, the solenoids S and S' are energized under the velocity control rheostat 61. Adjustment of the movable contact arm 64 of the velocity control rheostat will vary the resistance in the solenoid circuit and thus control the intensity of the magnetic field set up in either solenoid S or S', and by so doing will vary the extent to which the solenoids are capable of shifting the plunger 53 against the action of the springs 55 and 56. Variations in the amount of movement of the plunger 53 varies the distance the contacts 39 and 41 are shifted and hence determines the length of time that the pilot motor runs and consequently the distance that the control ring 14 is shifted. In this instance, the pilot motor is automatically stopped because the rack bar 27 is moved in the same direction as the contact carrier 52 and its contacts 39 and 41 when the pilot motor runs, which, of course, will bring the contact strips 43 to 46 of the rack bar out of engagement with the contacts 39 and 41 to automatically break the pilot motor circuit at the selected speed.

The reversing switch R combined as it is with the rack bar 27, and the latter being geared to the pilot or servo-motor 32, provides a follow-up device for the pilot or servo-motor functioning when the positioning rheostat 60 is in control to so regulate the action of the servo-motor 32 that it causes the transmission 6 first to shift the turret 2 to the selected position, and while this action is in progress the follow-up device is returning the control ring 14 to the zero speed band of the planet rollers 11, with the result that when the turret 2 arrives at the selected position, it will remain there, since the transmission 6 is then at zero speed, the reversing switch R open, and the pilot or servo-motor 32 stopped.

When the velocity control rheostat 61 is in control, the follow-up device brings the pilot or servo-motor 32 to a stop when it has run sufficiently to cause the rack bar 27 to shift the control 14 to the position on the planet rollers 11 that provides the desired speed whereupon the transmission 6 continues to run at that speed until the velocity control rheostat is again adjusted. As indicated, the application of the reversible power drive to a turret is merely illustrative. Obviously it may be applied with equal advantage to a rotary table or to any other rotary or tiltable support. It may be used in various sighting, steering, aiming, or positioning apparatus. For example, the rotary or tiltable support may be utilized as a mounting for a radio antenna to be tuned to receive a directional signal.

While an electric pilot or servo-motor may be used advantageously for both velocity and position control as hereinabove described, obviously this type of motor may be replaced by a hydraulic servo-motor with suitable follow-up device or with a servo-motor of the expansible chamber type equipped with a suitable follower device.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. The combination with a member to be trained mounted upon a reversely movable support, of a continuously running motor, a variable speed planetary transmission having input and output shafts, a rotary carrier actuated by the output shaft, an inclined planetary roller supported on the carrier for rotation therewith and with respect thereto, an internal ring gear connected to the output shaft, a planet pinion fixed to the roller and meshing with said internal end gear, said input shaft being connected to and driven by the motor, gearing between the output shaft and said support, a control ring adjustable axially of said roller to regulate its motion, a rack bar connected to the control ring, a pinion meshing with the rack bar, a pilot motor for reversely operating said pinion, a circuit for the pilot motor including a reversing switch having contacts mounted on the rack bar, movable contacts cooperable with said rack bar contacts, an arm carrying said movable contacts, a pair of solenoids having a common plunger, said arm being carried by the plunger, springs normally biasing said arm to a position wherein said reversing switch is open, a circuit for the windings of the solenoids, and a positioning rheostat incorporated in said circuit and including an adjustably supported resistance element for each solenoid winding and also a rheostat arm with which the resistance elements are selectively engageable, said arm being synchronized in its action with the output shaft.

2. The combination, with a device to be trained mounted upon a reversely movable support, of a motor constantly turning in the same direction, a variable speed planetary transmission including a rotary carrier driven by said motor, an inclined conical planetary roller supported on said carrier for rotation therewith and with respect thereto, a control ring encircling and contacting said roller and adjustable lengthwise thereof to regulate its motion and thereby provide for zero speed and for variation of forward and reverse speeds in infinitesimal amounts on both sides of zero, a planet pinion fixed to the planet roller, an internal ring gear driven by said planet roller, a driving connection between said ring gear and said reversely movable support, a rack bar connected to said control ring, a rack pinion meshed with said rack bar, an electric pilot motor driving said rack pinion, a circuit for said pilot motor, a reversing switch in said circuit including contact strips mounted on said rack bar, contacts cooperable with said contact strips, a pair of solenoids having a common plunger reciprocable in their winding, a carrier for said contacts fixed to and shifted by said plunger, a circuit for the windings of said solenoids, a rheostat in said last named circuit having an electrical resistance element for each solenoid winding, said electrical resistance elements being insulated from each other and a movable contact arm with which the resistance elements are selectively engageable, said contact arm being synchronized in its motion with the output shaft.

3. The combination with a member to be trained mounted upon a reversely movable support, of a continuously running motor, a variable speed planetary transmission having input and output shafts, a rotary carrier actuated by the output shaft, an inclined planetary roller supported on the carrier for rotation therewith and with respect thereto, an internal ring gear connected to the output shaft, a planet pinion fixed to the roller and meshing with said internal end gear, said input shaft being connected to and driven by the motor, gearing between the output shaft and said support, a control ring adjustable axially of said roller to regulate its motion, a pilot motor, motion transmission means between said pilot motor and said control ring, and a manually settable position control device regulating the action of said pilot motor whereby to bring the support to any preselected position within its range of travel and hold it in such position.

4. The combination with a member to be trained mounted upon a reversely movable support, of a continuously running motor, a variable speed planetary transmission having input and output shafts, a rotary carrier actuated by the output shaft, an inclined planetary roller supported on the carrier for rotation therewith and with respect thereto, an internal ring gear connected to the output shaft, a planet pinion fixed to the roller and meshing with said internal end gear, said input shaft being connected to and driven by the motor, gearing between the output shaft and said support, a control ring adjustable axially of said roller to regulate its motion, a pilot motor, motion transmission means between the pilot motor and the control ring to adjust the control ring axially of said roller and a manually settable velocity control device regulating the action of said pilot motor whereby the support may be driven at any selected speed or to reverse.

5. The combination with a member to be trained mounted upon a reversely movable support, of a continuously running motor, a variable speed planetary transmission having input and output shafts, a rotary carrier actuated by the output shaft, an inclined planetary roller supported on the carrier for rotation therewith and with respect thereto, an internal ring gear connected to the output shaft a planet pinion fixed to the roller and meshing with said internal end gear, said input shaft being connected to and driven by the motor, gearing between the output shaft and said support, a control ring adjustable axially of said roller to regulate its motion, a pilot motor, motion transmission means between said pilot motor and said control ring, a manually settable position control device for regulating the action of said pilot motor to bring the support to any pre-selected position within its range of travel and hold it in such position, a manually settable velocity control device for regulating the action of said pilot motor to drive the support at any pre-selected speed forward or reverse, and a manually operable switch device interrelated with the manually settable position control device, and with the manually settable velocity control device, whereby the operator may selectively establish a controlling relation between either the position control device or the velocity control device and the pilot motor.

6. The combination with a member to be trained mounted upon a reversely movable support, of a continuously running motor, a variable speed planetary transmission having input and output shafts, a rotary carrier actuated by the output shaft, an inclined planetary roller supported on the carrier for rotation therewith and with respect thereto, an internal ring gear connected to the output shaft, a planet pinion fixed to the roller and meshing with said internal end gear, said input shaft being connected to and driven by the motor, gearing between the output shaft and said support, a control ring adjustable axially of said roller to regulate its motion, a pilot motor, motion transmission means between said pilot motor and said control ring, and a manually settable electrical positioning control device whereby the speed cycle of the variable speed transmission is so produced as to bring the support to any pre-selected position within its range of travel and hold it there.

7. The combination with a member to be trained mounted upon a reversely movable support, of a continuously running motor, a variable speed planetary transmission having input and output shafts, a rotary carrier actuated by the output shaft, an inclined planetary roller supported on the carrier for rotation therewith and with respect thereto, an internal ring gear connected to the output shaft, a planet pinion fixed to the roller and meshing with said internal end gear, said input shaft being connected to and driven by the motor, gearing between the output shaft and said support, a control ring adjustable axially of said roller to regulate its motion, a pilot motor, motion transmission means between the pilot motor and said control ring, and a follow-up device for said pilot motor with a manual control for initiating the action of the pilot motor, the follow-up device automatically stopping the pilot motor upon completion of an operating cycle determined by the setting of the manual control.

LOUIS A. GRAHAM.